(12) United States Patent
Vanpage et al.

(10) Patent No.: US 6,493,886 B1
(45) Date of Patent: Dec. 17, 2002

(54) MATTRESS SUSPENSION SYSTEM FOR A VEHICLE

(76) Inventors: Jeffrey D. Vanpage, 3345 W. M-21, St. Johns, MI (US) 48879; Henry H. Morrow, 4245 E. Olive Rd., St. Louis, MI (US) 48880

( * ) Notice: Subject to any disclaimer, the term of this patent is extended or adjusted under 35 U.S.C. 154(b) by 0 days.

(21) Appl. No.: 09/679,337

(22) Filed: Oct. 4, 2000

(51) Int. Cl.[7] .......................... A47C 19/00; A47C 17/80; B60P 3/38; B62D 33/06
(52) U.S. Cl. .................................. 5/118; 296/190.02
(58) Field of Search ............................... 5/118, 11, 611, 5/94, 136; 296/190.02; 254/10 R, 10 B, 10 C

(56) References Cited

U.S. PATENT DOCUMENTS

| | | | | |
|---|---|---|---|---|
| 2,661,927 A | * | 12/1953 | Hulsart | 254/10 R |
| 2,818,567 A | * | 1/1958 | Oliver | 227/40 |
| 3,295,800 A | * | 1/1967 | Qvarnstrom et al. | 248/654 |
| 3,310,289 A | * | 3/1967 | Burke | 254/126 |
| 3,371,359 A | * | 3/1968 | Dome | 5/118 |
| 3,612,599 A | * | 10/1971 | Sternberg | 5/118 |
| 3,760,436 A | * | 9/1973 | Zach et al. | 5/118 |
| 3,882,558 A | * | 5/1975 | Christensen | 5/118 |
| 3,937,443 A | * | 2/1976 | Durgan | 254/10 B |
| 4,087,069 A | * | 5/1978 | Hall et al. | 5/118 |
| 4,107,797 A | * | 8/1978 | Maxwell, Sr. | 5/118 |
| 4,144,601 A | * | 3/1979 | Anderson et al. | 5/118 |
| 4,196,483 A | * | 4/1980 | Lefler et al. | 5/118 |
| 4,497,078 A | * | 2/1985 | Vogel et al. | 5/118 |
| 4,541,134 A | * | 9/1985 | Black et al. | 5/118 |
| 4,596,373 A | * | 6/1986 | Omi et al. | 248/562 |
| 4,669,139 A | * | 6/1987 | Richter, Jr. | 5/118 |
| 4,868,939 A | * | 9/1989 | Tagtow | 5/118 X |
| 4,979,248 A | * | 12/1990 | Kelley | 5/118 |
| 4,989,281 A | * | 2/1991 | Christensen | 5/118 |
| 5,218,728 A | * | 6/1993 | Lloyd et al. | 5/118 |
| 5,365,622 A | * | 11/1994 | Schirmer | 5/611 |
| 5,598,591 A | * | 2/1997 | Kelley | 5/118 |
| 5,713,091 A | * | 2/1998 | Houchin | 5/660 |
| 6,241,059 B1 | * | 6/2001 | Fujita et al. | 188/267 |
| 6,263,527 B1 | * | 7/2001 | Ross et al. | 5/118 |

FOREIGN PATENT DOCUMENTS

| | | | | |
|---|---|---|---|---|
| CA | | 1069225 | * 1/1980 | 5/118 |

* cited by examiner

Primary Examiner—Robert G. Santos
(74) Attorney, Agent, or Firm—Michael S. Neustel

(57) ABSTRACT

A mattress suspension system for a vehicle for comfortably supporting an individual resting upon a mattress within a moving vehicle. The mattress suspension system for a vehicle includes a lower frame attached to a floor of a vehicle, a plurality of pivot members pivotally attached to the lower frame and pivotally attached to a pair of first support members and a pair of second support members, a first shaft and a second shaft attached to the first support members and slidably extending through the pair of second support members, a plurality of pivot members pivotally attached to the first and second support members extending upwardly and pivotally attached to an upper frame, a support device attached between the lower frame and the upper frame, and a shock attached between the upper frame and the lower frame. The support device is preferably comprised of an air sleeve or other device capable of providing an upward force upon the upper frame.

20 Claims, 6 Drawing Sheets

MATTRESS SUSPENSION SYSTEM FOR A VEHICLE

BACKGROUND OF THE INVENTION

1. Field of the Invention

The present invention relates generally to vehicle bed devices and more specifically it relates to a mattress suspension system for a vehicle for comfortably supporting an individual resting upon a mattress within the vehicle while in motion.

2. Description of the Prior Art

Bed support devices for vehicles have been in use for years. Typically, conventional bed support devices for vehicles such as semi-tractors are not suitable for resting or sleeping upon while the vehicle is in motion. Conventional bed support devices for vehicles do not smoothly support an individual resting upon reducing the quality of the resting or sleep thereby leading to increased driver fatigue.

Examples of patented bed support devices which are illustrative of such prior art include U.S. Pat. No. 4,541,134 to Black et al.; U.S. Pat. No. 4,196,483 to Lefler et al.; U.S. Pat. No. 4,144,601 to Anderson et al.; U.S. Pat. No. 3,760,436 to Zach et al.; U.S. Pat. No. 5,598,591 to Kelley; U.S. Pat. No. 4,868,939 to Tagtow; U.S. Pat. No. 4,107,797 to Maxwell, Sr.; U.S. Pat. No. 5,638,560 to Rigdon et al.; U.S. Pat. No. 5,218,728 to Lloyd et al.; U.S. Pat. No. 4,989,281 to Christensen; U.S. Pat. No. 4,669,139 to Richter, Jr.; and U.S. Pat. No. 3,612,599 to Sternberg.

While these devices may be suitable for the particular purpose to which they address, they are not as suitable for comfortably supporting an individual resting upon a mattress within the vehicle. Conventional bed support devices for vehicles are very rough and difficult to sleep upon for a team of drivers while the vehicle is in motion.

In these respects, the mattress suspension system for a vehicle according to the present invention substantially departs from the conventional concepts and designs of the prior art, and in so doing provides an apparatus primarily developed for the purpose of comfortably supporting an individual resting upon a mattress within a moving vehicle.

SUMMARY OF THE INVENTION

In view of the foregoing disadvantages inherent in the known types of bed support devices now present in the prior art, the present invention provides a new mattress suspension system for a vehicle construction wherein the same can be utilized for comfortably supporting an individual resting upon a mattress within a moving vehicle.

The general purpose of the present invention, which will be described subsequently in greater detail, is to provide a new mattress suspension system for a vehicle that has many of the advantages of the bed support devices for vehicles mentioned heretofore and many novel features that result in a new mattress suspension system for a vehicle which is not anticipated, rendered obvious, suggested, or even implied by any of the prior art bed support devices for vehicles, either alone or in any combination thereof.

To attain this, the present invention generally comprises a lower frame attached to a floor of a vehicle, a plurality of pivot members pivotally attached to the lower frame and pivotally attached to a pair of first support members and a pair of second support members, a first shaft and a second shaft attached to the first support members and slidably extending through the pair of second support members, a plurality of pivot members pivotally attached to the first and second support members extending upwardly and pivotally attached to an upper frame, a support device attached between the lower frame and the upper frame, and a shock attached between the upper frame and the lower frame. The support device is preferably comprised of an air sleeve or other device capable of providing an upward force upon the upper frame.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a mattress suspension system for a vehicle that will overcome the shortcomings of the prior art devices.

A second object is to provide a mattress suspension system for a vehicle for comfortably supporting an individual resting upon a mattress within the vehicle while in motion.

Another object is to provide a mattress suspension system for a vehicle that reduces the roughness and bumps associated with conventional bed support devices utilized within vehicles while in motion.

An additional object is to provide a mattress suspension system for a vehicle that can be utilized most types of vehicles including but not limited to semi-tractors, trucks, buses and campers.

A further object is to provide a mattress suspension system for a vehicle that provides a more restful sleep for an individual thereby reducing stress and fatigue which can be dangerous.

Another object is to provide a mattress suspension system for a vehicle that increases the safety of drivers of commercial vehicles during extended periods of travel.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
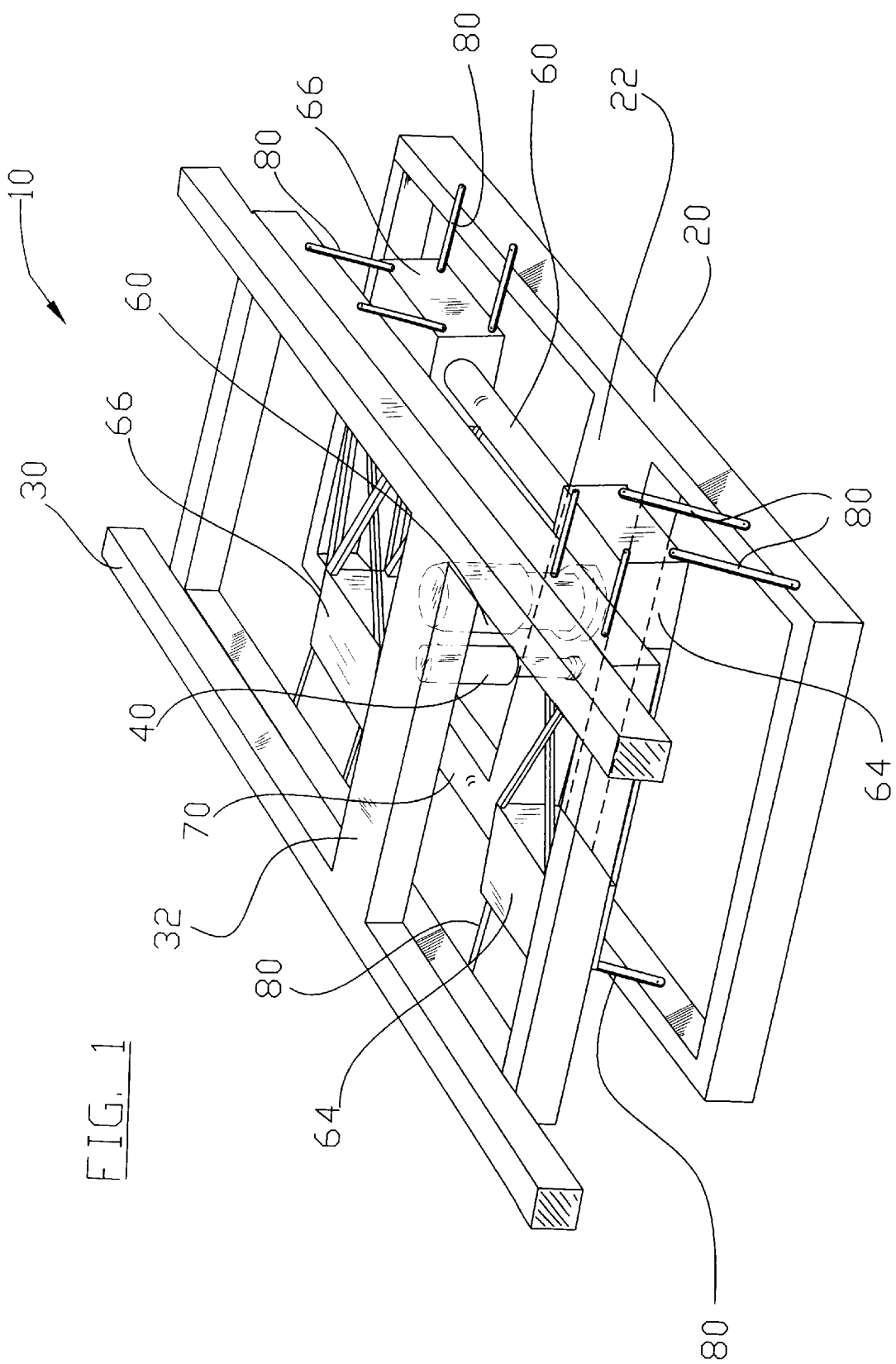
FIG. 1 is an upper perspective view of the present invention.

Turning now descriptively to the drawings, in which similar reference characters denote similar elements throughout the several views, FIGS. 1 through 6 illustrate a mattress suspension system for a vehicle 10, which comprises a lower frame 20 attached to a floor of a vehicle, a plurality of pivot members 80 pivotally attached to the lower frame 20 and pivotally attached to a pair of first support members 64 and a pair of second support members 66, a first shaft 60 and a second shaft 70 attached to the first support members 64 and slidably extending through the pair of second support members 66, a plurality of pivot members 80 pivotally attached to the first and second support members 66 extending upwardly and pivotally attached to an upper frame 30, a support device 50 attached between the lower frame 20 and the upper frame 30, and a shock 40 attached between the upper frame 30 and the lower frame 20. The support device 50 is preferably comprised of an air sleeve or other device capable of providing an upward force upon the upper frame 30.

Figure 5:
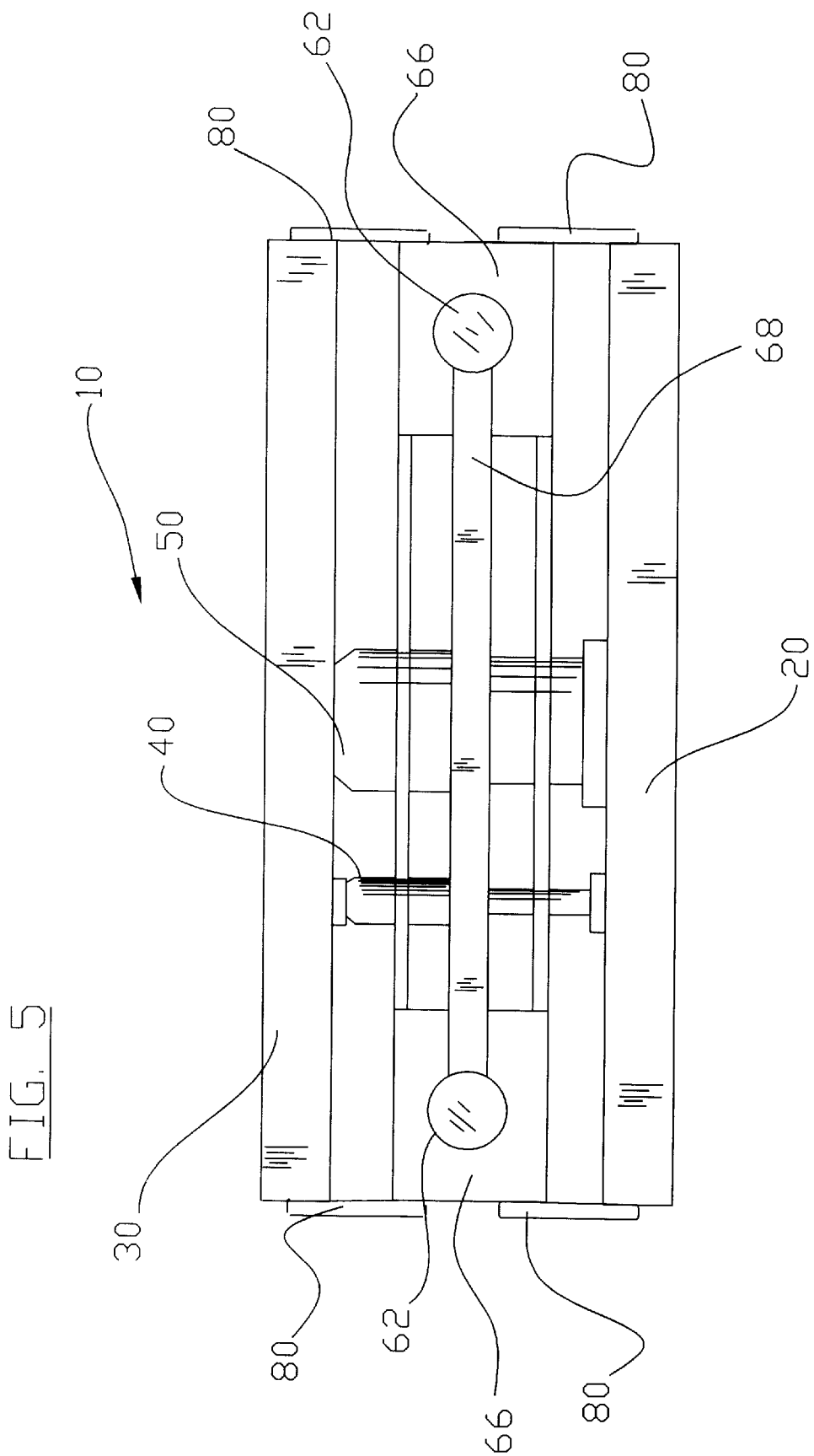
FIG. 5 is an end view of the present invention in a completely lowered position.

As shown in FIG. 1 of the drawings, the lower frame 20 is generally a flat structure formed to fit within most existing compartments of a vehicle such as a semitractor. The lower frame 20 is preferably rectangular shaped as shown within FIG. 1 of the drawings, however it can be appreciated that the lower frame 20 may have various shapes and designs. A lower center member 22 preferably extends across a central portion of the lower frame 20 for supporting the shock 40 and support device 50 opposite of the upper frame 30 as best shown in FIGS. 1 and 5 of the drawings.

Figure 6:
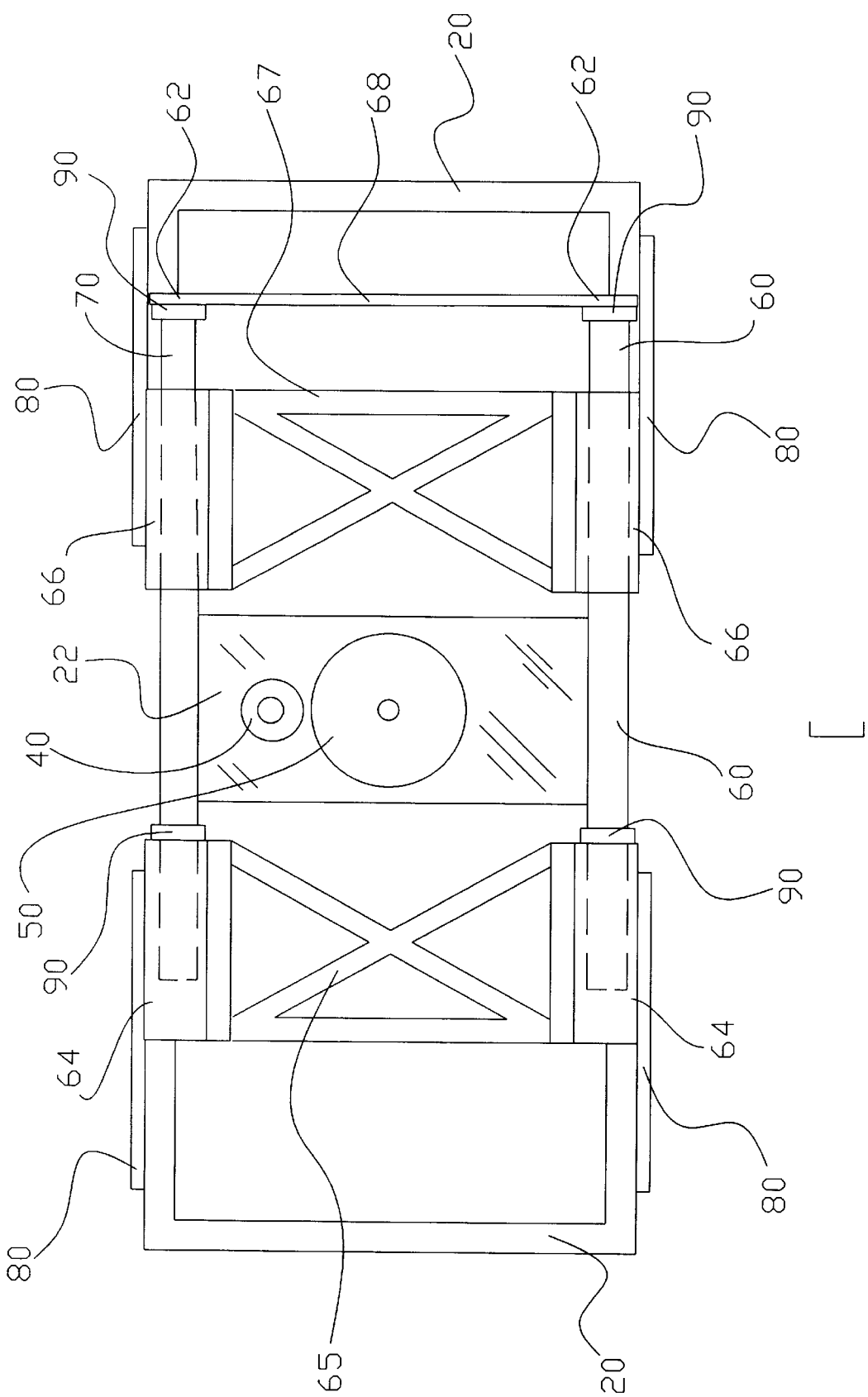
FIG. 6 is a top view of the present invention.

As further shown in FIG. 1 of the drawings, the upper frame 30 is generally a flat structure formed to fit within a vehicle such as a semi-tractor similar to the lower frame 20. The upper frame 30 is preferably rectangular shaped as shown within FIG. 1 of the drawings, however it can be appreciated that the upper frame 30 may have various shapes and designs. An upper center member 32 preferably extends across a central portion of the upper frame 30 for supporting the shock 40 and support device 50 opposite of the lower frame 20 as best shown in FIGS. 1 and 6 of the drawings. The upper frame 30 is formed to receive a mattress 12 or similar object utilized by an individual to rest upon.

At least one support device 50 preferably extends between the lower frame 20 and the upper frame 30 for movably supporting the upper frame 30 with respect to the lower frame 20. The support device 50 preferably applies an upward force from with respect to the lower frame 20 to the upper frame 30 for maintaining the upper frame 30 in an elevated position as shown in FIG. 3 of the drawings.

The support device 50 is preferably an air-powered device such as but not limited to an air sleeve or air cushion which is fluidly connected to the vehicle's air system. The support device 50 may then allow the upper frame 30 to be lowered upon the lower frame 20 when not in use by simply reducing the air pressure within the support device 50. Various other devices may be utilized to construct the support device 50 that are too numerous to discuss.

As shown in FIG. 1 and 6 of the drawings, at least one shock 40 preferably extends between the lower frame 20 and the upper frame 30 for dampening the upward and downward movement of the upper frame 30 with respect to the lower frame 20 during operation. The shock 40 may be comprised of any well-known device within the industry.

Figure 2:
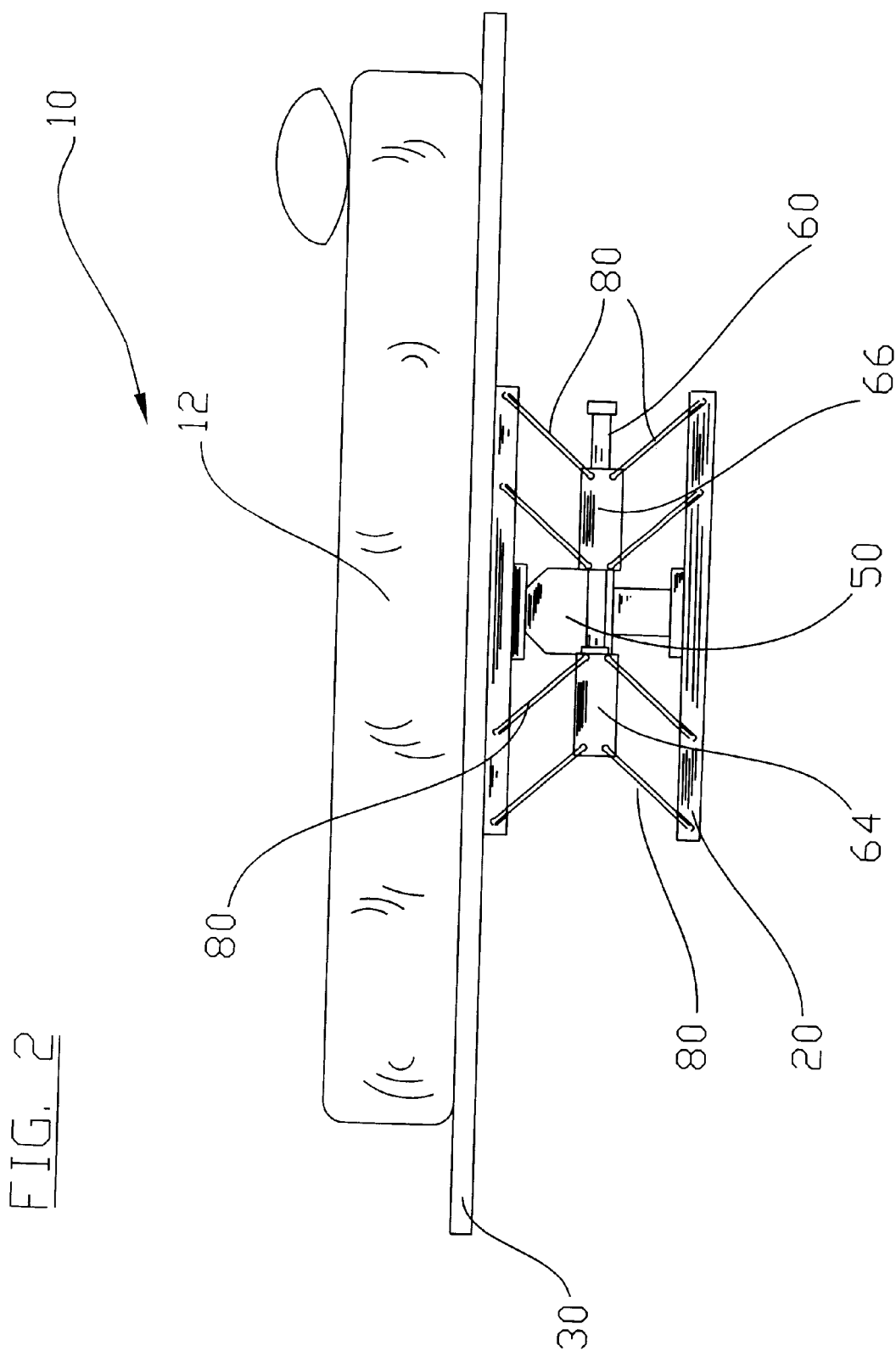
FIG. 2 is a side view of the present invention supporting a conventional bed mattress.
Figure 3:
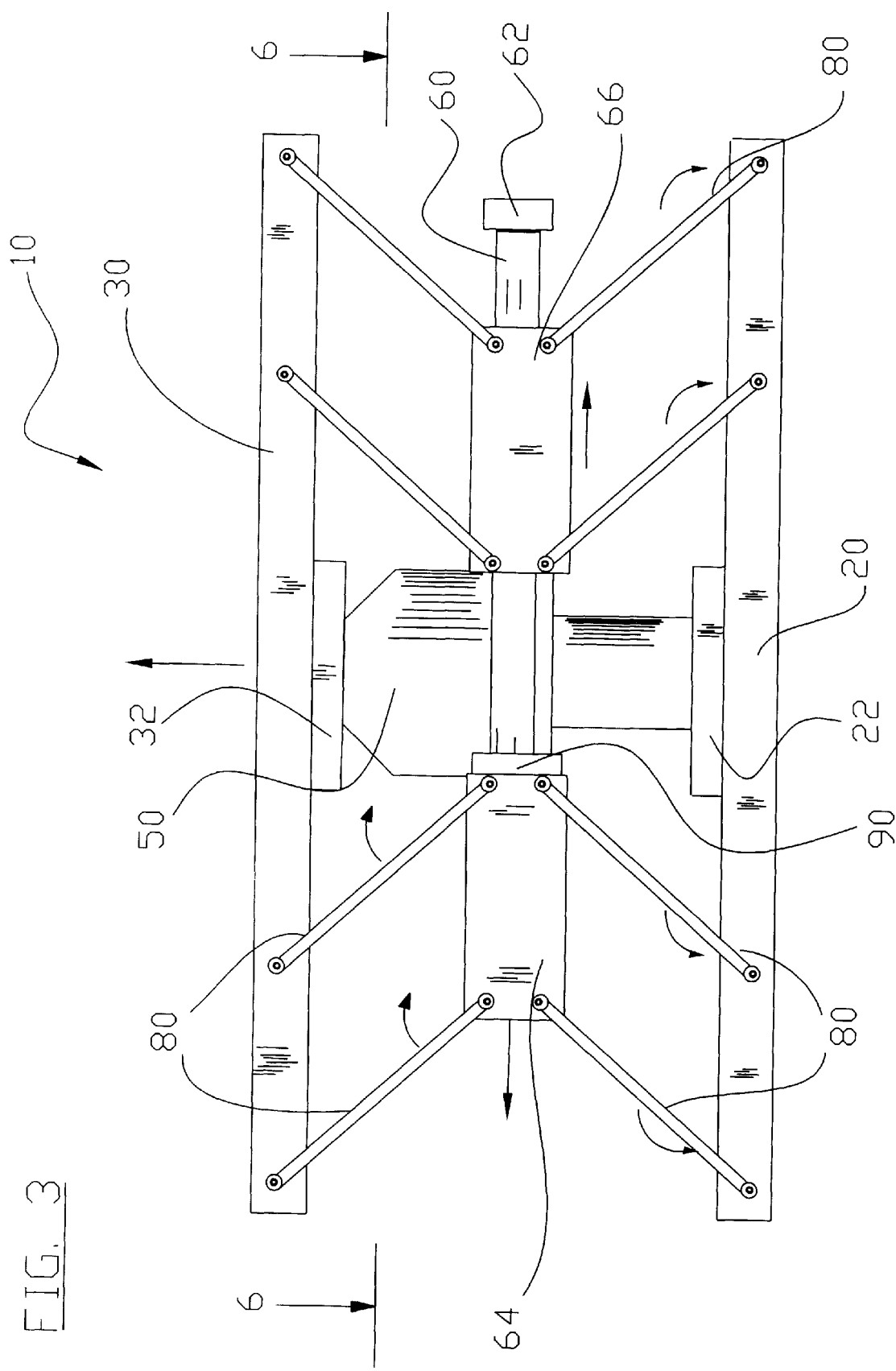
FIG. 3 is a side view of the present invention in an elevated position.
Figure 4:
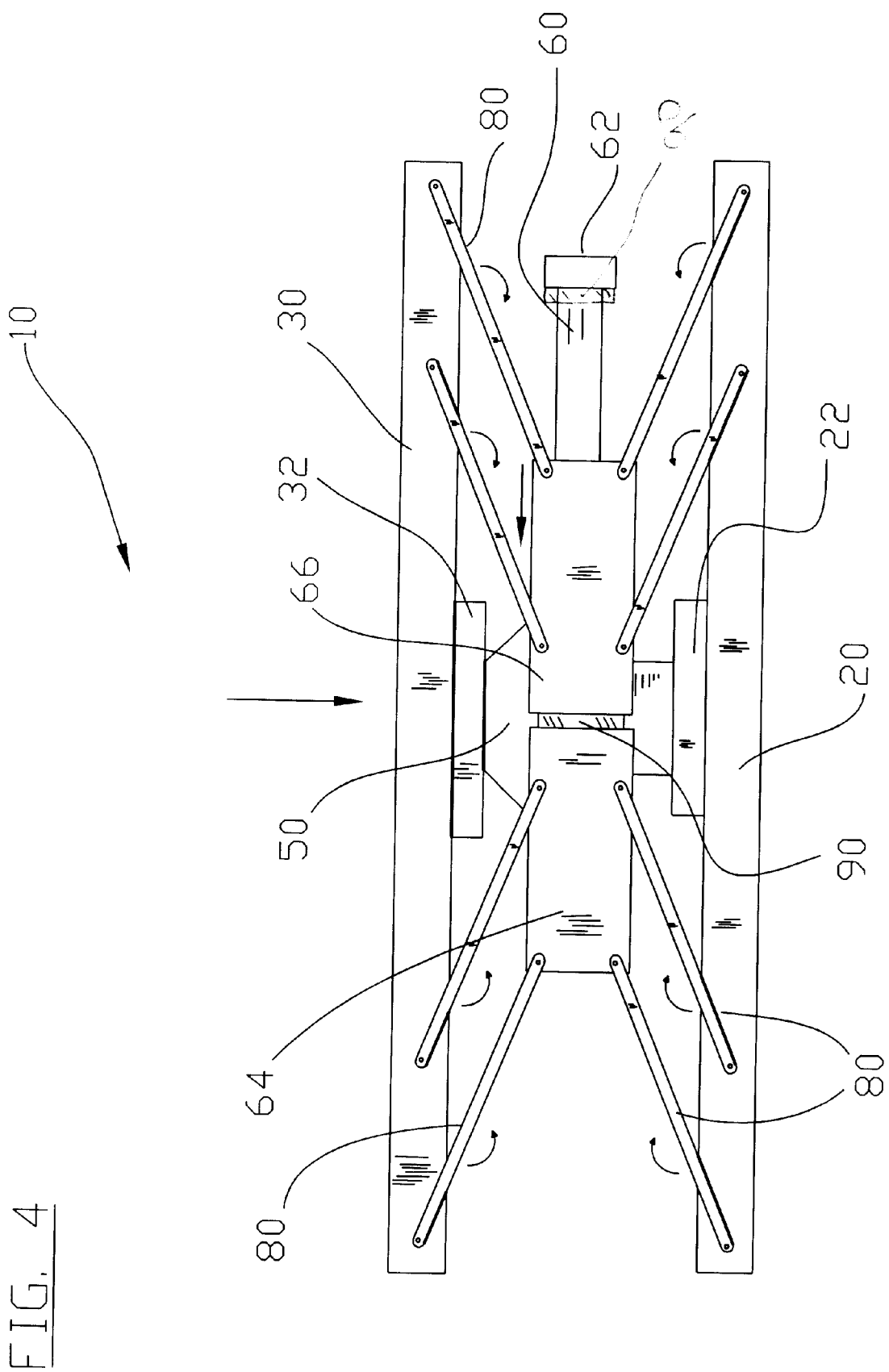
FIG. 4 is a side view of the present invention in a lowered position.

As best shown in FIGS. 1, 3, 4 and 6 of the drawings, a plurality of pivot members 80 are pivotally attached to opposing sides of the lower frame 20 and extend upwardly at an angle. The distal ends of the plurality of pivot members 80 are pivotally attached to a pair of first support members 64 and a pair of second support members 66 as best shown in FIGS. 3 and 4 of the drawings. As shown in FIGS. 2 through 4 of the drawings, the plurality of pivot members 80 are positioned parallel to one another as they are pivotally attached between the support members 64, 66 and the lower frame 20 thereby maintaining the support members 64, 66 within a level and parallel position at all times during operation of the present invention. It can be appreciated that the pair of first support members 64 and the pair of second support members 66 may be constructed of a single first support member and a second support member respectively.

As best shown in FIG. 6 of the drawings, a first shaft 60 and a second shaft 70 at attached to the pair of first support members 64 and extend toward and slidably pass through the pair of second support members 66. The distal end of the shafts 60, 70 opposite of the first pair of support members include a stopper 62 for preventing the second support members 66 from accidentally leaving the shafts 60, 70. An end member 68 is preferably attached between the distal ends of the shafts 60, 70 for increasing stability of the shafts 60, 70 during operation. It can be appreciated that the end member 68 may replace the need for the stoppers 62.

As best shown in FIG. 6 of the drawings, a plurality of first cross members 65 extend between the pair of first support members 64. The plurality of first cross members 65 may have various structures and configurations when extending between the pair of first support members 64. It can be appreciated that the plurality of first cross members 65 may also be comprised of a single solid structure. The plurality of first cross members 65 provide stability between the pair of first support members 64 and the shafts 60, 70 during operation.

As best shown in FIG. 6 of the drawings, a plurality of second cross members 67 extend between the pair of second support members 66. The plurality of second cross members 67 may have various structures and configurations when extending between the pair of second support members 66. It can be appreciated that the plurality of second cross members 67 may also be comprised of a single solid structure. The plurality of second cross members 67 provide stability between the pair of second support members 66 and the shafts 60, 70 during operation.

As shown in FIGS. 3 and 4 of the drawings, the second pair of support members slidably extend along the shafts 60, 70 via a bore within the second support members 66. As best shown in FIG. 6 of the drawings, the shafts 60, 70 each have a longitudinal axis that is parallel to one another. A cushion member 90 attached to an end of each of the first support members 64 assists in absorbing an engagement between the support members 64, 66 when the upper frame 30 is lowered significantly.

As further shown in FIGS. 2 through 4 of the drawings, a plurality of upper pivot members 80 are pivotally attached to the support members 64, 66. The plurality of upper pivot members 80 extend upwardly from the support members 64, 66 to pivotally engage and support the upper frame 30 as further shown in FIGS. 1 through 4 of the drawings. As with the lower pivot members 80, these upper pivot members 80 are parallel to one another for maintaining the upper frame 30 in a level position at all times regardless of the vertical position of the upper frame 30. The upper pivot members 80 are positioned at an angle that mirrors the angle of the lower pivot members 80 as shown in FIGS. 2 through 4 of the drawings.

In use, the user positions the mattress 12 upon the upper frame 30 and adjusts the air pressure within the support device 50 to the desired amount. During movement of the vehicle rough terrain may be encountered which causes the lower frame 20 to move upwardly or downwardly relatively fast thereby causing a rough ride with conventional bed support devices. With the present invention, the upward or downward movement of the lower frame 20 is absorbed by the shock 40 and the support device 50 thereby reducing the severity of the impact to the individual positioned upon the mattress 12. When the lower frame 20 is moved upwardly, the shock 40 and the support device 50 are compressed inwardly thereby dampening the amount of upward force applied to the upper frame 30 and mattress 12. As the lower frame 20 moves upwardly the plurality of lower pivot members 80 and the plurality of upper pivot members 80 extend inwardly causing the support members 64, 66 to move toward one another thereby maintaining the upper frame 30 and mattress 12 in a desired position as shown in FIG. 4 of the drawings. When lower frame 20 is moved downwardly, the shock 40 and support device 50 are expanded thereby dampening the amount of downward force applied to the upper frame 30 and mattress 12. As the lower frame 20 moves downwardly the plurality of lower pivot members 80 and the plurality of upper pivot members 80 extend outwardly causing the support members 64, 66 to move away from one another thereby maintaining the upper frame 30 and mattress 12 in a desired position as shown in FIG. 3 of the drawings. This process continues during the movement of the vehicle thereby reducing the impacts incurred by an individual resting or sleeping upon a mattress 12 within a vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A mattress suspension system for a vehicle, comprising:
   a lower frame attachable within a vehicle;
   an upper frame for supporting a mattress;
   a support device extending between said lower frame and said upper frame, wherein said support device provides an upward force upon said upper frame;
   a plurality of lower pivot members pivotally attached to said lower frame;
   a pair of first support members and a pair of second support members pivotally attached to said lower pivot members opposite of said lower frame;
   a plurality of upper pivot members pivotally attached to said upper frame and pivotally attached to said first support members and said second support members; and
   a pair of shafts extending from said first support members and slidably extending within said second support members, wherein said pair of said second support members slide upon said pair of shafts towards said pair of first support members when said upper frame is lowered and wherein said pair of said second support members slide upon said pair of shafts away from said pair of first support members when said upper frame is raised.

2. The mattress suspension system for a vehicle of claim 1, including at least one shock extending between said lower frame and said upper frame.

3. The mattress suspension system for a vehicle of claim 1, wherein each of said pair of shafts include a stopper at a distal end thereof.

4. The mattress suspension system for a vehicle of claim 1, including at least one first cross member extending between said pair of first support members.

5. The mattress suspension system for a vehicle of claim 1, including at least one second cross member extending between said pair of second support members.

6. The mattress suspension system for a vehicle of claim 1, wherein said support device is comprised of an air sleeve.

7. The mattress suspension system for a vehicle of claim 1, including a cushion member attached to said first support members in opposition to said second support members.

8. The mattress suspension system for a vehicle of claim 1, wherein said lower pivot members and said upper pivot members have an equal length.

9. The mattress suspension system for a vehicle of claim 1, wherein said upper pivot members are equally divided into a left group and a right group wherein said left group are pivotally attached to said first support members and wherein said right group are pivotally attached to said second support members, and wherein said left group are parallel to one another and wherein said right group are parallel to one another.

10. The mattress suspension system for a vehicle of claim 9, wherein said lower pivot members are equally divided into a left group and a right group wherein said left group are pivotally attached to said first support members and wherein said right group are pivotally attached to said second support members, and wherein said left group are parallel to one another and wherein said right group are parallel to one another.

11. A mattress suspension system for a vehicle, comprising:
   a lower frame;
   an upper frame positioned above said lower frame;
   a means for applying an upward force upon said upper frame;

a plurality of lower pivot members pivotally attached to said lower frame;

a first support member and a second support member pivotally attached to said lower pivot members opposite of said lower frame;

a plurality of upper pivot members pivotally attached to said upper frame and pivotally attached to said first support member and said second support member; and at least one shaft extending from said first support member and slidably non-movable extending within said second support member, wherein said second support member slides upon said at least one shaft towards said first support member when said upper frame is lowered and wherein-said second support member slides upon said at least one shaft away from said first support member when said upper frame is raised.

12. The mattress suspension system for a vehicle of claim 11, including at least one shock extending between said lower frame and said upper frame.

13. The mattress suspension system for a vehicle of claim 11, wherein said at least one. shaft includes a stopper at a distal end thereof.

14. The mattress suspension system for a vehicle of claim 11, wherein said means for applying an upward force is comprised of an air sleeve.

15. The mattress suspension system for a vehicle of claim 11, wherein said at least one shaft is comprised of a pair of shafts.

16. The mattress suspension system for a vehicle of claim 15, including an end member attached between the distal ends of said pair of shafts.

17. The mattress suspension system for a vehicle of claim 11, including a cushion member attached to said first support member in opposition to said second support member.

18. The mattress suspension system for a vehicle of claim 11, wherein said lower pivot members and said upper pivot members have an equal length.

19. The mattress suspension system for a vehicle of claim 11, wherein said upper pivot members are equally divided into a left group and a right group wherein said left group are pivotally attached to said first support member and wherein said right group are pivotally attached to said second support member, and wherein said left group are parallel to one another and wherein said right group are parallel to one another.

20. The mattress suspension system for a vehicle of claim 19, wherein said lower pivot members are equally divided into a left group and a right group wherein said left group are pivotally attached to said first support member and wherein said right group are pivotally attached to said second support member, and wherein said left group are parallel to one another and wherein said right group are parallel to one another.

* * * * *